United States Patent [19]

Barnes

[11] Patent Number: 4,971,540

[45] Date of Patent: Nov. 20, 1990

[54] APPARATUS FOR LAYING A MAT OF FIBROUS MATERIAL

[75] Inventor: Michael C. Barnes, Doncaster, England

[73] Assignee: Compak Systems Limited, England

[21] Appl. No.: 288,162

[22] Filed: Dec. 22, 1988

[30] Foreign Application Priority Data

Dec. 22, 1987 [GB] United Kingdom ................. 8729894

[51] Int. Cl.[5] ............................................... B29C 13/00

[52] U.S. Cl. ........................................ 425/81.1; 19/87; 19/92; 264/40.2; 264/113; 264/116; 264/40.7; 425/82.1; 425/83.1; 425/736; 425/141; 425/147; 425/154; 425/174.6; 425/202; 425/224; 425/297; 425/301

[58] Field of Search ..................... 425/80.1, 81.1, 82.1, 425/83.1, 136, 140, 141, 142, 154, 200, 201, 202, 296, 297, 303, 304, 222–224, 305, 306, 307, 308, 289, 174.6, 289, 301; 264/109, 112, 113, 114, 116, 118, 40.2, 40.4, 518, 40.7, 121, 122; 19/87, 91–93, 97; 100/100; 156/62.2, 62.4, 62.6

[56] References Cited

U.S. PATENT DOCUMENTS

| | | | |
|---|---|---|---|
| 2,467,291 | 4/1949 | Brelsford et al. | 425/83.1 |
| 3,158,668 | 11/1964 | Johnson | 425/82.1 |
| 3,641,627 | 2/1972 | Lee et al. | 425/83.1 |
| 3,738,476 | 6/1973 | Hullett et al. | 19/97.5 |
| 3,897,185 | 7/1975 | Beyer | 425/81.1 |
| 4,035,869 | 7/1977 | Wilkes et al. | 19/97.5 |
| 4,060,363 | 11/1977 | Nelson | 425/DIG. 230 |
| 4,068,991 | 1/1978 | Ufermann et al. | 425/81.1 |
| 4,097,209 | 6/1978 | Garrick et al. | 425/83.1 |
| 4,123,212 | 10/1978 | Piazza | 264/112 |
| 4,247,497 | 1/1981 | Wolf | 264/113 |
| 4,415,516 | 11/1983 | Krueger et al. | 264/113 |
| 4,432,714 | 2/1984 | Forry et al. | 425/83.1 |
| 4,557,882 | 12/1985 | Arnold | 264/112 |
| 4,790,966 | 12/1988 | Sandberg et al. | 264/113 |

FOREIGN PATENT DOCUMENTS

| | | | |
|---|---|---|---|
| 3115728 | 11/1982 | Fed. Rep. of Germany | 425/81.1 |
| 53-52583 | 5/1978 | Japan | 264/40.4 |
| 58-36433 | 3/1983 | Japan | 264/24 |
| 61-47860 | 3/1986 | Japan | 425/80.1 |
| 396176 | 4/1932 | United Kingdom . | |
| 840508 | 4/1957 | United Kingdom . | |
| 893586 | 1/1960 | United Kingdom . | |
| 907712 | 7/1960 | United Kingdom . | |
| 928961 | 3/1961 | United Kingdom . | |
| 962188 | 7/1964 | United Kingdom | 264/109 |
| 1178835 | 1/1966 | United Kingdom . | |
| 1125362 | 9/1966 | United Kingdom . | |
| 1350675 | 8/1971 | United Kingdom . | |
| 1368488 | 8/1971 | United Kingdom . | |
| 1477520 | 7/1974 | United Kingdom . | |
| 1602701 | 11/1977 | United Kingdom . | |
| 2092627A | 8/1982 | United Kingdom | 19/97.5 |
| 2125450A | 8/1983 | United Kingdom . | |
| 2146312A | 4/1985 | United Kingdom | 425/80.1 |

*Primary Examiner*—Jeffery Thurlow
*Assistant Examiner*—Mathieu Vargot
*Attorney, Agent, or Firm*—Diller, Ramik & Wight

[57] ABSTRACT

An apparatus for laying a mat of fibrous material which includes an upwardly inclined belt onto which the fibrous material is fed, one or more combing roller located above the belt, a stripping roller at the upper end of the belt for removing the material from the belt and passing it into a mechanism for laying the material into a mat. The angle of inclination of the incline belt and the position of the first combing roller as such that the material can build up to reach a critical angle of repose and then slide back down. A second combing roller located upstream of the first combing roller serves to comb the material to a constant depth, and the speed of the incline belt is adjustable to determine the amount of material leaving the incline belt and thus regulate the thickness of the formed mat.

18 Claims, 2 Drawing Sheets

APPARATUS FOR LAYING A MAT OF FIBROUS MATERIAL

BACKGROUND OF THE INVENTION

This invention is concerned with apparatus for laying a mat of fibrous material.

SUMMARY OF THE INVENTION

Apparatus for laying a mat of fibrous material according to the present invention comprises an upwardly inclined belt onto which the fibrous material is adapted to be fed, one or more combing rollers located above the belt, and a stripping roller at the upper end of the belt for removing the material from the belt and passing it into means for laying a mat of the said material.

Preferably the material is fed to the inclined belt from a horizontal belt, conveniently through rollers arranged as a barrier to ensure an even feed rate.

Preferably also two combing rollers are provided in series. In this case the angle of inclination of the belt and the position of the first combing roller (i.e. the downstream one) is located so that the material can build up in an unconstrained and unconfined manner behind it to reach its critical angle of repose and then slide back down rearwardly thereof. In this case a photo electric cell may be provided adapted to form a light beam behind the first combing roller, interruption of which is arranged to stop the horizontal belt and hence the feed of further material to the inclined belt.

The second combing roller is preferably located upstream of the first combing roller and serves to comb the material to a constant depth.

The speed of the inclined belt is adjustable so as to determine the amount of material leaving it, and hence the thickness of the mat.

After leaving the stripping roller the material preferably passes to a chute and thence to a movable caul adapted to be moving when the apparatus is operational.

Preferably means are included for weighing the amount of material on the movable caul. The caul is preferably movable in opposite directions so that a mat can be laid in two passes to give a double thickness. This is particularly useful where thick mats are required.

End plates may also be provided on the caul to assist in catering for end effects. Furthermore, adjustable flaps may be provided to assist in forming the edges of the mat.

The invention may be performed in various ways and one specific embodiment will now be described by way of example with reference to the accompanying drawings in which:

Brief Description of the Drawings

FIG. 1 shows the layout of a machine for making boards from straw and other raw fibrous materials and of which apparatus according to the present invention forms a part as will be more fully explained.

Description of the Preferred Embodiments

Figure 1:
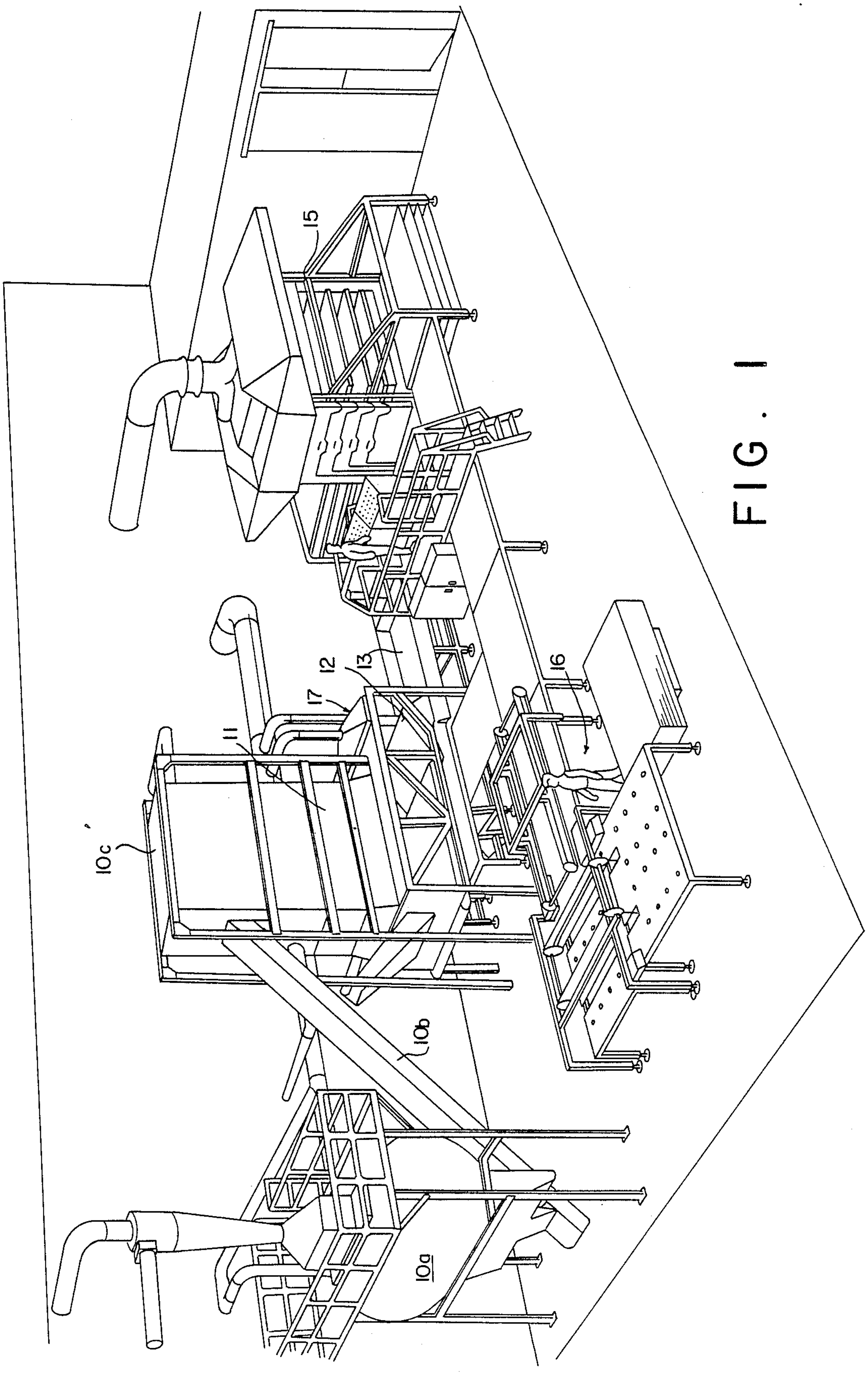
FIG. 1 — is a general view of apparatus of which the present invention forms a part.

In the machine straw is supplied to a straw chopper (not shown) from whence it is fed to a bulk hopper 10*a*, an elevator 10*b*, a bulk weighing hopper 10*c* and a resinating chamber 11 in which a resin bonding agent is mixed in with the straw. Experiments have shown that an ideal mixture is 95% - 97% straw and 3% - 5% bonding agent. It has moreover been found that a particularly suitable bonding agent is methyl di-isocyanate. The straw and resin mix then passes into a mat (mattress) laying apparatus 12 which will be described in more detail below after which the laid mats are fed via cauls 13 which feed the mat into a press indicated at 15. After leaving the press 15 the finished mats are transported on the cauls to a removal station 16 where they are removed prior to trimming where they are removed, sawn to size and stacked.

As mentioned above the present Application is concerned with the apparatus for laying the mat and which will now be described more fully with reference to FIG. 2.

Figure 2:
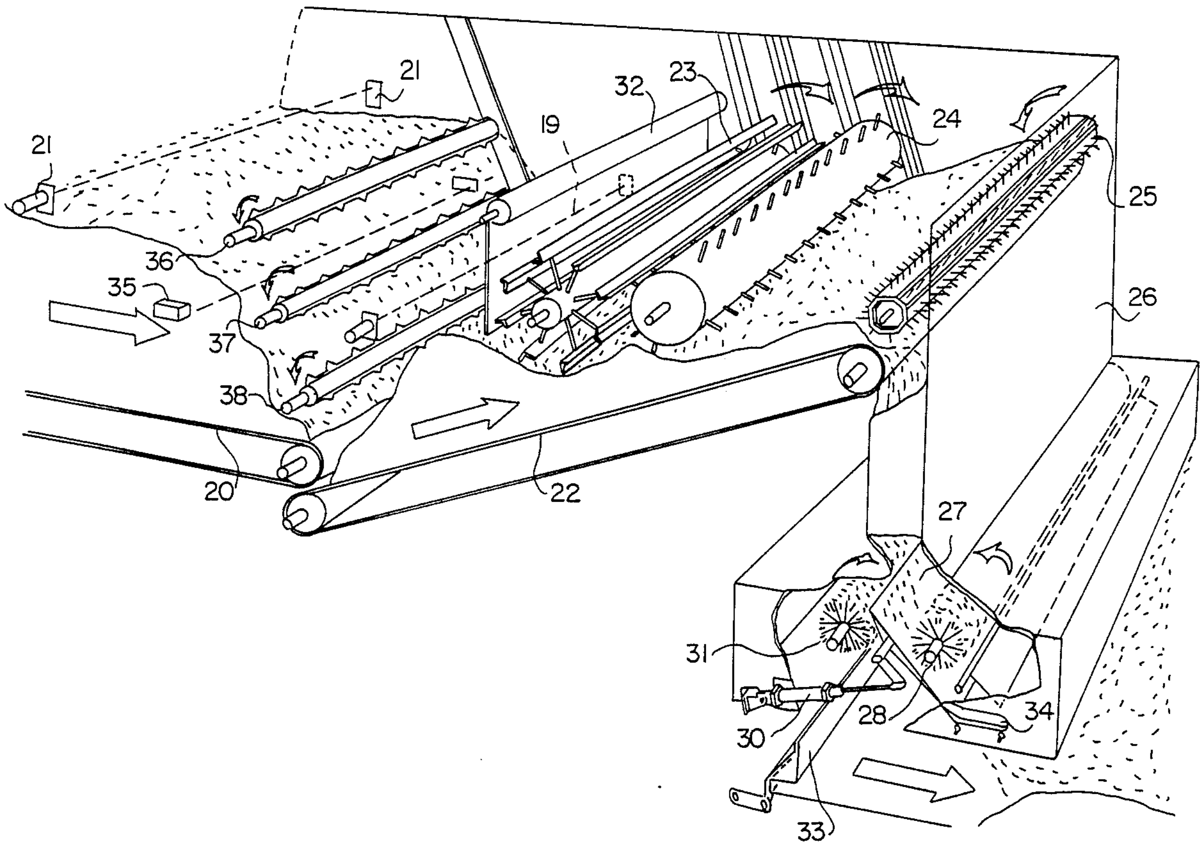
FIG. 2 — is a perspective view of apparatus according to the present invention.

In FIG. 2 there is shown in more detail the right hand end of the mat laying apparatus indicated generally at 17 in FIG. 1. The resinated straw is passed onto a continuous belt 20, the right hand end of which is shown in FIG. 2 by opening doors in the base of the resinating chamber 11.

The drive to the belt 20 is controlled by a photo electric cell emitting a beam 19, the belt moving when the beam is unbroken and stopping when the beam is broken.

Further photo electric cells 21 and 35 give overriding control to prevent excess resinated material being fed onto the belt 20 and to prevent mat laying if there is insufficient material available.

The straw passes from the horizontal belt 20 via distributing rollers 36, 37 and 38 onto an upwardly inclined belt 22 which is only driven when it is required to lay a mat and is switched on and off in sequence with the caul track which is chain driven.

When the belt 22 is operating it moves in the direction of the arrow and the straw meets the action of first and second combing rollers 23 and 24 which both rotate in a clockwise direction as shown as by their respective arrows and drive excess material back. These rollers continue to rotate when the inclined belt 22 is stationary.

The angle of the inclined belt and the positioning of the rollers 23 and 24 are chosen so that the material which builds up behind the first roller 23 must be able to build up to reach its critical angle of repose and slide back down towards the light beam. The second roller 24 combs the material to a constant depth so that at constant speed of the inclined belt 22 a constant volume of material is carried up the belt to a stripping roller 25 which ensures that the material is pulled off the belt in a uniform stream.

The first combing roller 23 has a series of angle irons which form the "teeth" whilst those on the second combing roller 24 are much finer and are formed by a series of spikes. The teeth on the stripping roller 25 are also spikes but are much more numerous and finer than those of the second combing roller 24.

The material leaving the stripping roller 25 falls into a vertical chute 26 and thence onto an inclined deflector plate 27 and is pulled through by a rotating brush 28 which rotates anti-clockwise in the direction of the arrow. The deflector plate 27 is movable from the position shown by means of a mechanism 30 into a position where the straw passes under a similar roller 31 which also rotates in the direction of its arrow and in the opposite direction to the roller 28.

In the position shown in FIG. 2 the mat is laid with the caul moving from left to right.

For thick boards it is preferable to lay the mat in two passes. This helps to cancel out end effects and also gives a chevron effect to the strata of laid material preventing end loadings of the platens during pressing in the press 15.

To make this second pass the deflector plate 27 is moved into its other position by the mechanism 30 and the caul is then moved back again from right to left with the rotating brush 31 pulling the material off the deflector plate 27.

The caul onto which the mat is laid is mounted on a weighing mechanism which measures the amount of material laid. The weight of the mat laid is adjustable by altering the speed of the inclined belt 22 thus permitting more or less material to be passed by the stripping roller 25 into the chute 26.

A screen 32 is provided to prevent material thrown off the first combing roller 23 from interfering with the light beam 19.

The ends of the mat are formed by end plates 33 and end effects are provided for by firstly selecting a correct end plate height, secondly selecting a slowing down of the caul travel speed towards the end of the laying of the mat and also taking into account whether single or double pass laying is being used.

A further control of mat thickness along the edges of the mat is obtained by adjustable flaps 34. These deflect a small amount of material away from the edges of the mat throwing up a slight ridge further into the mat. This compensates for the effect of material moving out from the edges of the mat when in the press and allows uniform density to be achieved much closer to the edge of the board than would otherwise occur.

I claim:

1. Apparatus for laying a mat of fibrous material comprising first conveyor means for conveying fibrous material along a first generally horizontal path of travel in a first direction, said first conveyor means having a discharge end, second conveyor means for conveying fibrous material along a second generally upwardly slightly inclined path of travel in said first direction, said second conveyor means having remote entrance and discharge ends, said second conveyor means entrance end being positioned adjacent said first conveyor means discharge end whereby fibrous material discharged from said first conveyor means discharge end is deposited upon said second conveyor means entrance end, first combing roller means positioned along and above said second conveyor means and between said second conveyor means entrance and discharge ends for combing fibrous material moving in said first direction in a second direction generally opposite to said first direction, said first combing roller means being further positioned adjacent a critical angle of repose of fibrous material built-up in an unconstrained and unconfined condition immediately downstream and adjacent said first combing roller means whereby such built-up fibrous material automatically slides back in said second direction along said second conveyor means, means adjacent said second conveyor end entrance end for detecting the unconstrained and unconfined material which has slid back in said second direction, and means responsive to said detecting means for discontinuing the operation of said first conveyor means to prevent the further discharge of fibrous material from said first conveyor means discharge end to said second conveyor means entrance end.

2. The apparatus as defined in claim 1 including second combing roller means positioned along and above said second conveyor means and between said first combing roller means and said second conveyor means discharge end for combing fibrous material moving in said first direction in said second direction to a generally uniform depth.

3. The apparatus as defined in claim 1 including means for preventing said detecting means from operating in response to fibrous material impelled airborn by said first combing means.

4. The apparatus as defined in claim 1 including means contiguous and upstream of said first combing means for preventing said detecting means from operating in response to fibrous material impelled airborn by said first combing means.

5. The apparatus as defined in claim 1 including screen means contiguous and upstream of said first combing means for preventing said detecting means from operating in response to fibrous material impelled airborn by said first combing means.

6. The apparatus as defined in claim 1 including third conveyor means for conveying the fibrous material beyond said second conveyor means discharge end, and said second conveyor means discharge end being constructed and arranged to deposit fibrous material upon said third conveyor means.

7. The apparatus as defined in claim 1 including third conveyor means for conveying the fibrous material beyond said second conveyor means discharge end, said second conveyor means discharge end being constructed and arranged to deposit fibrous material upon said third conveyor means, and said third conveyor means being selectively operative for movement in substantially said first and second directions over substantially at least one coterminous reciprocal path of travel during the discharge of fibrous material from said second conveyor means discharge end whereby a double-pass mat is formed upon said third conveyor means.

8. The apparatus as defined in claim 1 including third conveyor means for converying the fibrous material beyond said second conveyor means discharge end, said second conveyor means discharge end being constructed and arranged to deposit fibrous material upon said third conveyor means, said third conveyor means being selectively operative for movement in substantially said first and second directions over substantially at least one coterminous reciprocal path of travel during the discharge of fibrous material from said second conveyor means discharge end whereby a double-pass mat is formed upon said third conveyor means, and means between said second conveyor means discharge end and said third conveyor means for directing fibrous material selectively in one of two directions depending upon the direction of movement of said third conveyor means.

9. The apparatus as defined in claim 1 including third conveyor means for conveying the fibrous material beyond said second conveyor means discharge end, said second conveyor means discharge end being constructed and arranged to deposit fibrous material upon said third conveyor means, said third conveyor means being selectively operative for movement in substantially said first and second directions over substantially at least one coterminous reciprocal path of travel during the discharge of fibrous material from said second conveyor means discharge end whereby a double-pass mat is formed upon said third conveyor means, and brush means between said second conveyor means discharge end and said third conveyor means for directing fibrous material selectively in one of two directions depending upon the direction of movement of said third conveyor means.

10. The apparatus as defined in claim 1 including third conveyor means for conveying the fibrous material beyond said second conveyor means discharge end, said second conveyor means discharge end being constructed and arranged to deposit fibrous material upon said third conveyor means, said third conveyor means being selectively operative for movement in substantially said first and second directions over substantially at least one coterminous reciprocal path of travel during the discharge of fibrous material from said second conveyor means discharge end whereby a double-pass mat is formed upon said third conveyor means, and deflector means between said second conveyor means discharge end and said third conveyor means for directing fibrous material selectively in one of two directions depending upon the direction of movement of said third conveyor means.

11. The apparatus as defined in claim 1 including third conveyor means for conveying the fibrous material beyond said second conveyor means discharge end, said second conveyor means discharge end being constructed and arranged to deposit fibrous material upon said third conveyor means, said third conveyor means being selectively operative for movement in substantially said first and second directions over substantially at least one coterminous reciprocal path of travel during the discharge of fibrous material from said second conveyor means discharge end whereby a double-pass mat is formed upon said third conveyor means, and brush and deflector means between said second conveyor means discharge end and said third conveyor means for directing fibrous material selectively in one of two directions depending upon the direction of movement of said third conveyor means.

12. The apparatus as defined in claim 1 including third conveyor means for conveying the fibrous material beyond said second conveyor means discharge end, said second conveyor means discharge end being constructed and arranged to deposit fibrous material upon said third conveyor means, said third conveyor means being effective to convey fibrous material thereon in at least one of said first and second directions, and means for creating the greatest depth of the fibrous material along opposite lateral edges thereof upon said third conveyor means.

13. The apparatus as defined in claim 2 including means for preventing said detecting means from operating in response to fibrous material impelled airborn by said first combing means.

14. The apparatus as defined in claim 2 including third conveyor means for conveying the fibrous material beyond said second conveyor means discharge end, said second conveyor means discharge end being constructed and arranged to deposit fibrous material upon said third conveyor means, and said third conveyor means being selectively operative for movement in substantially said first and second directions over substantially at least one coterminous reciprocal path of travel during the discharge of fibrous material from said second conveyor means discharge end whereby a double-pass mat is formed upon said third conveyor means.

15. The apparatus as defined in claim 2 including third conveyor means for conveying the fibrous material beyond said second conveyor means discharge end, said second conveyor means discharge end being constructed and arranged to deposit fibrous material upon said third conveyor means, said third conveyor means being selectively operative for movement in substantially said first and second directions over substantially at least one coterminous reciprocal path of travel during the discharge of fibrous material from said second conveyor means discharge end whereby a double-pass mat is formed upon said third conveyor means, and means between said second conveyor means discharge end and said third conveyor means for directing fibrous material selectively in one of two directions depending upon the direction of movement of said third conveyor means.

16. The apparatus as defined in claim 2 including third conveyor means for conveying the fibrous material beyond said second conveyor means discharge end, and said second conveyor means discharge end being constructed and arranged to deposit fibrous material upon said third conveyor means.

17. The apparatus as defined in claim 15 including third conveyor means for conveying the fibrous material beyond said second conveyor means discharge end, and said second conveyor means discharge end being constructed and arranged to deposit fibrous material upon said third conveyor means.

18. The apparatus as defined in claim 16 including third conveyor means for conveying the fibrous material beyond said second conveyor means discharge end, and said second conveyor means discharge end being constructed and arranged to deposit fibrous material upon said third conveyor means.

* * * * *